March 29, 1932.  W. T. BARKER, JR  1,851,235
MOLD CHARGE DELIVERY APPARATUS
Filed Jan. 4, 1929  2 Sheets-Sheet 2
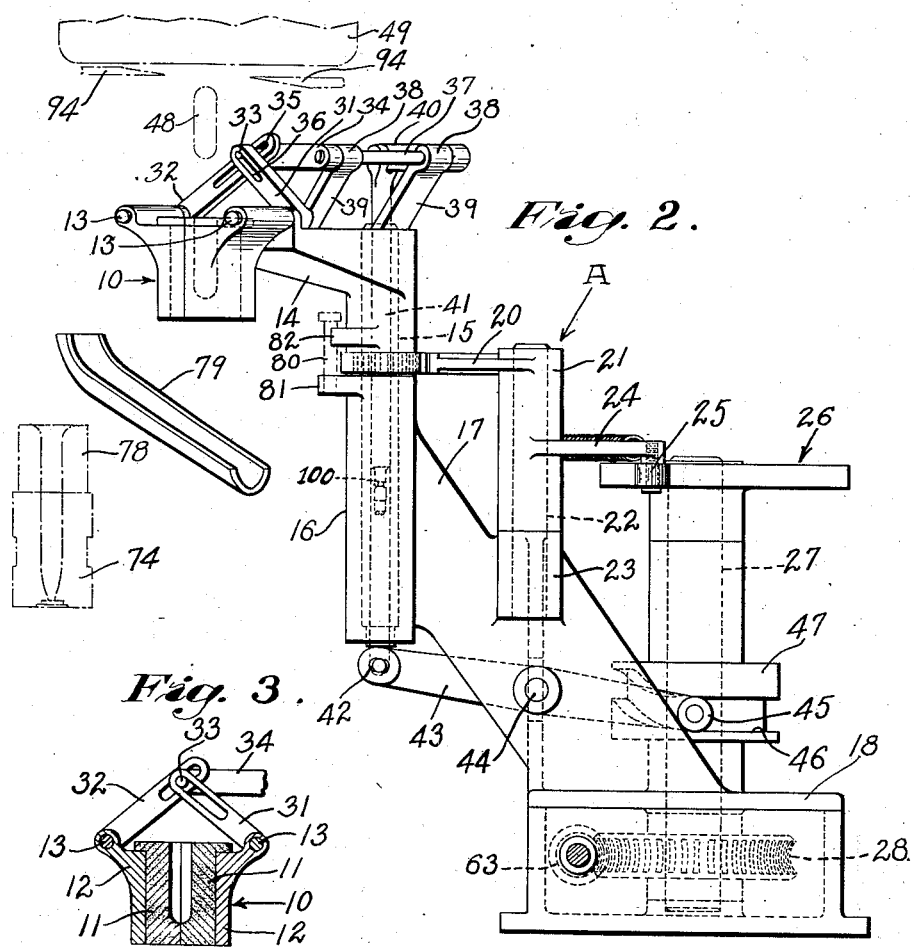
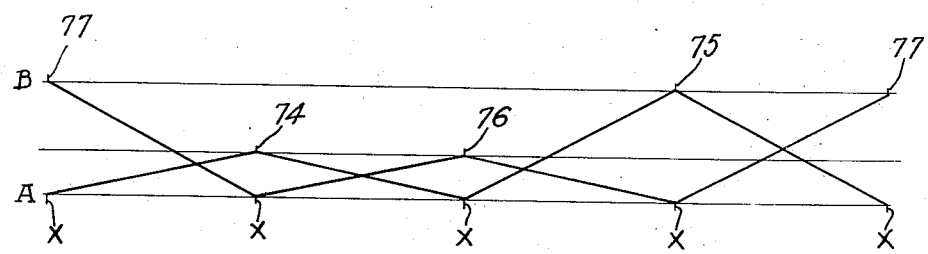
Witness:
Winslow B. Thayer
Inventor:
William T. Barker Jr.
by Robert D. Brown
Attorney Patented Mar. 29, 1932                                                        1,851,235

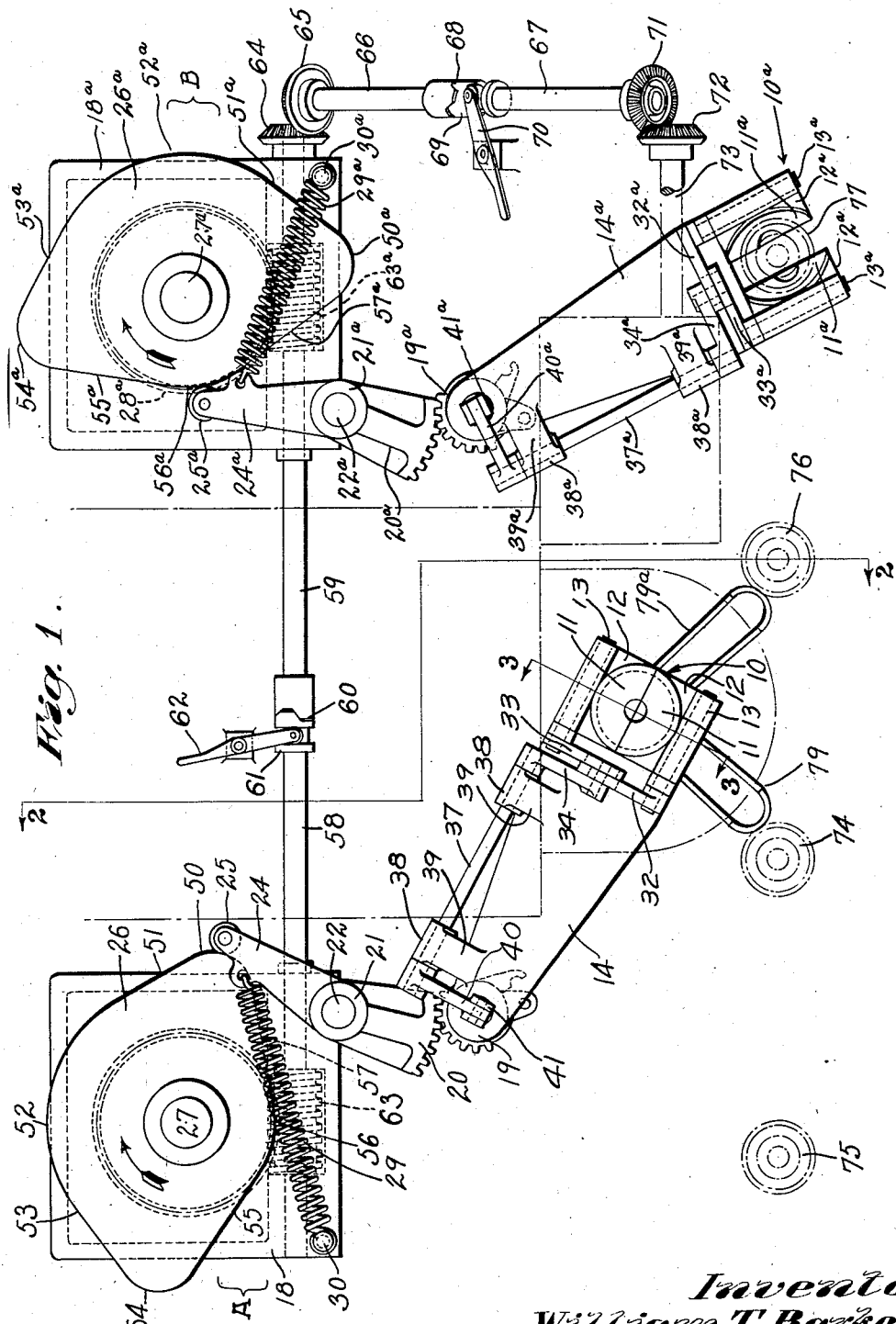

UNITED STATES PATENT OFFICE

WILLIAM T. BARKER, JR., OF HARTFORD, CONNECTICUT, ASSIGNOR TO HARTFORD-EMPIRE COMPANY, OF HARTFORD, CONNECTICUT, A CORPORATION OF DELAWARE

MOLD CHARGE DELIVERY APPARATUS

Application filed January 4, 1929. Serial No. 330,284.

My invention relates to the delivery of charges of molten glass from a glass feeder to molds of a glassware fabricating machine or machines.

An object of the invention is to provide an improved apparatus which will afford facilities for transferring mold charges of glass from a single glass feeding means to a relatively large number of mold charging stations successively and in a predetermined cyclic order and for delivering the mold charges centrally into the cavities of the molds at the respective mold charging stations in proper time relation to the movements of such molds.

A further object of the invention is to provide mold charge delivery apparatus of the type described which can be controlled as to operation so as to permit use of heat from the mold charges to heat the glass contacting members of the delivery apparatus preliminarily so as to assure proper temperature conditions of the mold charges which are delivered subsequently to the molds.

A still further object of the invention is the provision in mold charge delivery apparatus of the character described of control mechanism operable to arrest the delivery of mold charges to certain or all of the mold charging stations for any given time and to deliver such mold charges to a cullet receiving means without interrupting the normal cyclic movements of the glass feeder or of glassware fabricating machines to which it is desired to subsequently deliver charges from the feeder.

Other objects and advantages of the invention will be apparent from the following description, when it is considered in conjunction with the accompanying drawings, in which Fig. 1 is plan view of mold charge delivery apparatus embodying the invention as applied to a glass feeder, partially shown in dot and dash lines, and as arranged for delivery of mold charges from the feeder to a plurality of individual mold charging stations in a predetermined cyclic order.

Fig. 2 is a sectional elevation taken substantially along the line 2—2 of Fig. 1, looking in the direction of the arrows, Fig. 3 is a vertical section through the mold charge transfer cup of one of the units of the improved apparatus, the view being taken substantially along the line 3—3 of Fig. 2, and Fig. 4 is a diagram showing the cycles of the respective mold charge transfer units of the apparatus shown in Fig. 1.

A practical embodiment of the invention comprises multiple units, each including mechanism for receiving a charge of molten glass below the discharge outlet of a glass feeder and for transferring such charge in a generally lateral direction to a plurality of individual mold charging stations in a cyclic order, such mold charging stations being spaced laterally or out of vertical alignment with the feeder outlet, and for delivering each mold charge at a mold charging station vertically and centrally into a mold at that station, together with driving and actuating mechanism for the respective units properly coordinated and synchronized with respect to one another and to the operations of the associate glass charge feeder and the fabricating machine or machines so that such units receive mold charges in a cyclic order below the feeder outlet and as above stated, each unit delivers the different mold charges received thereby during each cycle to molds at different mold charging stations in a given order. The improved apparatus also includes means which can be placed in operation when desired to alter the mold transferring movements of one or all of the respective units to certain or all of the mold charging stations so that while each of such units receives mold charges below the outlet of the feeder at the usual times in its cycle, all the mold charges received by such unit are delivered thereby to a chute leading to a cullet receptacle or to a cullet receptacle direct, thus permitting the feeder to continue operation while the associated fabricating machine or machines are thrown out of operation temporarily for repairs or for any other purpose or permitting preliminary heating of the glass contacting members of the transfer units before charges received thereby are delivered to the molds of the associated fabricating machine or machines and in each instance assuring resumption or restoration at any desired time of properly synchronized and coordinated operations of the associated feeder delivery mechanism and glassware fabricating machine or machines.

The improved mold charge delivery apparatus illustrated in the drawings is particularly well adapted to deliver mold charges from the discharge outlet of a glass feeder, such as the Hartford-Empire single feeder, a disclosure which may be found in British Patent No. 227,078, accepted Aug. 27, 1925, to the molds at the respective mold charging stations of the Hartford-Empire individual section glassware forming machine, disclosed in British Patent No. 257,637, accepted Sept. 7, 1926, although the invention is not limited to the delivery of mold charges from that particular feeder to that particular glass fabricating machine but is capable of use to deliver mold charges from any suitable glass feeder to any suitably located mold charging stations for one or more fabricating machines of various types of construction.

In the drawings, however, the practical embodiment of the invention is shown in conjunction with a portion of the feeder bowl or forehearth and the discharge outlet of the Hartford-Empire single feeder and with the respective mold charging stations spaced horizontally and substantially in a straight line in a manner suitable for the delivery of charges of molten glass to the blank molds of a four-section Hartford-Empire individual section glassware fabricating machine.

Referring now specifically to the drawings, the embodiment of the invention shown in Fig. 1 comprises two mold charge transfer units generally designated A and B, respectively. These units are substantially identical so far as the structural details of the component parts thereof are concerned and consequently, the following description of the structural features of the unit A applies also to the unit B. The parts of the unit B, which correspond to hereinafter described parts of unit A, therefore will not be specifically described but each of such parts will be indicated in the drawings by the same reference numeral as the corresponding part of the unit A plus the letter *a*.

The unit A comprises a transfer cup 10, which as shown in Fig. 3 comprises a pair of complementary glass receiving sections 11 made of brush carbon or other suitable material which will cause a minimum chilling of the glass and can be used in contact with the glass when relatively hot without sticking of the glass thereto. The cup sections 11 are removably supported in cooperative relation with each other by a pair of holders 12 which are secured on pivot pins 13. The pivot pins 13 are shown as projecting from the outer end of a rocker arm 14 (Figs. 1 and 2) and as journalled in suitable bearings on the latter. The rocker arm 14 is secured to a vertical shaft 15 that is journalled in a vertical bearing 16. The bearing 16 is carried by a bracket 17 which may be attached to or form a part of any suitable stationary or fixed support, being shown in Fig. 2 as being carried by a housing 18, the purpose of which will be presently described. The hub portion of the rocker arm 14 has an integral laterally extending segmental gear portion 19, the teeth of which extend in a circle concentric with the shaft 15, and are in mesh with the teeth of a cooperating segmental gear 20 which forms one of the arms of a bell crank lever 21 that is fulcrumed to swing about the axis of a vertical shaft 22 which may be journalled or supported in a bearing or lug 23 on the bracket 17. The other arm of the bell crank lever 21 is indicated at 24 and carries a roller 25 that is in rolling contact with the peripheral surface of a cam 26. The cam 26 is secured on the upper end portion of a vertically disposed cam shaft 27, the lower end portion of which depends within the aforesaid housing 18 and carries a worm wheel 28 (Fig. 2). A spring 29 is connected at one end of the arm 24 of the bell crank lever 21 and at its other end to a fixed support 30 which may be carried by the housing 18 (see Fig. 1). The spring 29 is under tension and tends to hold the roller 25 against the periphery of the cam 26.

The pins 13 on which the holders 12 for the cup sections are secured carry rocker arms 31 and 32, respectively, having longitudinally slotted portions arranged to cross each other. A pin 33 which projects laterally from a vertically swingable arm 34 extends through the slots 35 and 36 of the arms 32 and 31, respectively, so that the downward movement of the pin 33 from the position shown in Fig. 2 will rock the holders 12 and the cup sections 11 about the axes of the pins 13 away from each other to permit a charge of glass to fall vertically downward from the cavity of the cup. The arm 34 is carried by a shaft 37 that is disposed in parallel relation to the pins 13 and is journalled in bearings 38 on lugs or brackets 39 on the rocker arm 14. An actuating rocker arm 40 for rocking the shaft 37 is secured at one end to the latter and is pivotally connected at its other end to the upper end of a vertically movable connecting rod 41. The connecting rod 41 is slidable in a vertical bore that is formed through the shaft 15 and the lower end of the connecting rod is suitably connected, as by the pin and slot arrangement shown at 42 in Fig. 2, with one end of a lever 43 for operating such rod. In order that the upper part of the rod 41 may turn angularly about its axis as the rocker arm 14 is rocked in a horizontal plane without necessitating any corresponding angular turning movement of the part of the rod that is connected with the lever 43, such rod may comprise axially aligned sections swivelly connected at their adjacent ends by any suitable known joint or connection, such as shown more or less diagrammatically at 100 in Fig. 2. The lever 43 is fulcrumed intermediate its length to swing about the axis of the horizontal pivot pin 44, which may be carried by the bracket 17 and the other end of the lever 43 carries a cam roll 45 that is arranged to travel in a closed cam groove 46 in the periphery of a cam 47. The cam 47 is secured to the aforesaid cam shaft 27.

The cam shaft is rotated in a manner to be presently described in properly synchronized relation with the movements of the operating mechanism of the associated feeder.

The cam groove 46 is laid out so that the above described transfer cup opening and closing mechanism will be actuated to close the transfer cup when it is in position to receive a mold charge, such as indicated at 48, below the feeder outlet of a glass feeding forehearth 49, as shown in Fig. 2, and to open the sections of the transfer cup when the transfer cup has been swung by the operation of the transfer cup operating mechanism to a mold charging station.

The cam 26 shown in the drawings has its peripheral or working surface formed to provide a dwell portion 50 for maintaining the transfer cup 10 in its glass charge receiving position beneath the outlet of the feeder, a portion 51 permiting the transfer cup 10 to be swung by the spring 29 from the mold charge receiving position to a mold charging station, a dwell portion 52 for maintaining the transfer cup at the mold charging station during the opening of the cup sections and the dropping of the charge therefrom into the mold at such station, a portion 53 for returning the transfer cup to the glass charge receiving station, a dwell portion 54 for maintaining the cup at the charge receiving station until a charge has been received therein, a portion 55 for permitting the transfer cup to be swung by the spring from the charge receiving position past the first mold charging station to a second mold charging station, a dwell portion 56 for maintaining the transfer cup at the second mold charging station until the mold charge has been delivered to the mold at that station and a portion 57 for returning the transfer cup again to the mold charge receiving station.

The mechanism for driving the cam shafts of the units A and B may include a final drive shaft having the axially aligned adjacent sections 58 and 59, respectively, connected by the clutch 60, which may be of the "single tooth" type and which incldes a clutch member 61 shiftable by a lever 62 to disconnect the section 58 from the section 59 when desired. The section 58 of the drive shaft carries a worm 63 housed in the housing 18 and in mesh with the worm wheel 28 while the section 59 of the drive shaft includes a similar worm 63a in mesh with the worm wheel 28a on the cam shaft 27a of the unit B. The section 59 may have a bevel gear 64 in mesh with the bevel gear 65 on an intermediate shaft which comprises the sections 66 and 67 and the clutch mechanism 68 between such sections. The clutch 68 is similar to the clutch 60 and includes a clutch member 69 shiftable by the lever 70 to interrupt the driving connection between the sections 66 and 67 when desired. The section 67 of the intermediate drive shaft may have a bevel gear 71 in mesh with a bevel gear 72 on a shaft 73 which may be an extension of the drive shaft of the associated feeder or other suitable rotating operating part of the feeder. The cam shafts of the mold charge delivery units thus will be driven synchronously with the driving mechanism of the associated feeder and the gearing, cams, and other parts of the transfer cup operating mechanism are so proportioned and adjusted that the transfer cups will be brought alternately to position beneath the feeder outlet to receive alternate mold charges of glass which may be severed from glass discharged through the feeder outlet by the periodic operations of shear blades such as those indicated more or less diagrammatically at 94 in Fig. 2.

The clutch member 61 may be actuated to stop the rotation of the section 58 of the final drive shaft so that the unit A will remain inactive while the operation of the unit B continues or the clutch member 69 may be actuated if desired to discontinue the driving connection between the sections 67—66 of the intermediate drive shaft so that both the units A and B will remain inactive during the continued operation of the feeder. In either instance, the synchronized relation between the operations of the charge transfer unit or units and the operations of the charge producing parts of the feeder will be restored when the clutch mechanism is further actuated to restore the driving connection between the parts that have been de-clutched.

Each of the units as thus described is adapted to deliver mold charges at two mold charging stations alternately. With the arrangement shown in Fig. 1, the unit A will deliver charges to the molds 74 and 75 at the mold charging stations indicated alternately while the unit B will deliver mold charges to the molds 76 and 77 at the mold charging stations indicated. The cycles of the units A and B are represented diagrammatically in Fig. 4, beginning with the transfer cups of such units at the positions shown in Fig. 1. It will be noted that the transfer cup of the unit A at the beginning of its cycle is located in its charge receiving position beneath the outlet while the transfer cup of the unit B is disposed at a mold charging station above the mold 77 and is in the act of depositing its mold charge in the latter. For convenience, the mold charge receiving station will be indicated in the diagram by the letter X while the mold charging stations to which the transfer cups are moved during their cycles of operations will be represented by the reference numerals of the molds to be charged at such stations as shown in Fig. 1. The cycle of the unit A thus will comprise a dwell of the transfer cup at the station X until the cup has received a mold charge below the feeder outlet, a movement to the mold charging station over the mold 74 and a dwell at that station until the charge has been delivered to the mold, a movement back to the charge receiving station X and a dwell at that station until the transfer cup has received its charge, a movement to a mold charging station over the mold 75 and a dwell at such station while the charge is being delivered to the mold 75 and a return to the station X for the reception of another charge and the initiation of a new cycle of operations. The cycle of the unit B occurring at the same time comprises a dwell at the mold charging station over the mold 77 while the mold charge was being delivered to the mold, a movement to the charge receiving station X and a dwell at that station for the time required to receive a mold charge, a movement from the station X to a mold charging station over the mold 76 and a dwell at that place until a mold charge had been delivered to the mold, a return movement back to the station X to receive another mold charge and a movement to the mold charging station over the mold 77 to initiate a new cycle of operations. Thus, one of the units is delivering a charge to a mold while the other unit is receiving a charge from the feeder and therefore practically the entire productive capacity of the feeder may be utilized. The four mold charging stations shown in Fig. 1 are the stations at which the blank molds of the Hartford-Empire individual section glassware forming machine are brought successively in each cycle of such fabricating machine but it is obvious that such mold charging stations may be the stations for charging the molds of a plurality of glassware fabricating machines. The mold charging stations above the molds 77 and 76 and the charge receiving station X, below the feeder outlet as shown in Fig. 1, all lie in an arc of a circle struck by the radius moving about the axial line of the shaft 15a of the unit B as a center and having a length equal to the straight line distance between the axial line of the shaft 15a and the axial line of the charge receiving cavity within the cup 10a of the unit B. Similarly, the axial lines of the molds 75 and 74 at the mold charging stations shown in Fig. 1 and the axial line of the charge receiving station below the outlet X all lie in an arc of a circle struck by a radius moving about the axial line of the shaft 15 as a center and having a length equal to the straight line distance between the axial line of the shaft 15 of the unit A and the axial line of the glass receiving cavity in the cup 10. Thus, it is obvious that glass charges formed and severed in suspension below the discharge outlet of the feeder and dropped vertically downward into the transfer cup of either of the units will have practically uniform contact with the walls of the cavity of the transfer cup, such cavity preferably being formed to conform substantially to the contour of the preformed charge so that very little shaping action will take place in the cup. However, it is obvious that it is within the scope of the invention to use the transfer cups as a glass accumulating and/or shaping cups if desired, instead of for the reception of preformed and severed suspended charges as illustrated in the drawings and as hereinbefore described. Since the transfer cup of each of the units is directly over and in vertical alignment with a mold when the transfer cup is at any of the mold charging stations to which it moves during each cycle of its operation, such mold charge will be delivered vertically downward centrally into the underlying mold and may settle in the latter so as to contact uniformly with the walls of the mold. The molds at the mold charging stations may have guide funnels mounted thereon or disposed thereabove as indicated at 78 for the mold 74 in Fig. 2, to aid in guiding the delivered charges centrally downward into the molds. Since the mold charges are dropped into the molds at the mold charging stations from points directly over such molds, the molds at the mold charging stations may be located at a level which need not be much lower than the level at which the charges are formed and delivered to the transfer cups, thus permitting the fabricating machine or machines to be disposed on the same floor as the feeder. Heretofore, when a plurality of fabricating machines were fed with charges from a single feeder outlet, it has been usual to employ inclined delivery chutes and to place the fabricating machines in pits or cavities below the floor of the feeder room in order that the angle of inclination of the mold charges from the vertical at the time they enter the molds may be kept sufficiently slight to permit the mold charges to be directed without undue distortion in a generally vertical direction into the mold cavities.

It may be desirable at times to stop the operation of the fabricating machine or machines temporarily for repairs or any other useful purpose without stopping the operation of the associated feeder. The improved apparatus then may be employed to deliver the glass charges that are produced by the feeder to cullet chutes which may be disposed at the positions indicated at 79 and 79a, respectively, Fig. 1 of the drawings. In the use of the unit A to deliver glass charges to the cullet chute 79, a stop pin 80 is placed in the apertured lug 81 on the bearing 16 (see Fig. 2). Then, the movement of the rocker arm 14 from the position shown in Fig. 1 after each charge receiving dwell of the transfer cup at the mold charge receiving station will be arrested when the transfer cup is over the cullet chute 79 by reason of the contact of a laterally extending stop lug 82 on the hub of the rocker arm 14 with the extending upper portion of the stop pin 80 until the rocker arm is actuated to return the cup to the charge receiving station. The transfer cup 10 thus will move back and forth between the mold charge receiving station and a position over the cullet chute 79 as the cam 26 rotates. At the proper times in each cycle of rotation of the cam shaft, the cup opening mechanism will be actuated to drop the charges into the cullet chute. When the stop pin 80 has been removed from the lug 81, the unit A will resume its delivery of mold charges to the molds 74 and 75 at the stations indicated in the former timed relation to the feeder operations. The unit B, of course, includes stop mechanism identical with that just described whereby the swinging movements of the rocker arm 14a away from the charge receiving station below the feeder outlet are halted above the cullet chute 79a. This feature of the invention also permits the preliminary heating of the glass receiving sections of the transfer cup to such an extent that the charges subsequently delivered to the molds will have substantially the temperature at the time of their delivery that they had when they were received by the transfer cup. Such charges thus will have the proper temperature and condition for fabrication in the molds into practically perfect articles of glassware and in carrying out this feature of the invention. the stop pins 80 and 80a are employed to stop the delivery movements of the transfer cups over the cullet chutes so that charges will not be delivered to the molds until the cup sections have been heated by the glass previousy received therein to the desired extent. The stop pins then are removed to permit the delivery of the subsequently received charges to the molds at the respective mold charging stations.

It will be understood that the operations of the feeder and of the associate fabricating machine or machines are synchronized by suitable means, not shown, so that the molds to be charged will be brought to the respective mold charging stations at the proper times to receive charges from the transfer cups substantially in the manner hereinbefore described.

It also is to be understood that the invention is not limited to the particular arrangement or specific details of construction herein shown and described but may be modified in various ways within the scope of the invention to adapt it to various conditions of service.

I claim:

1. Glass delivery apparatus comprising a plurality of units, each including a movable glass transfer member, and means for operating said units to move the transfer members of the respective units successively to position to receive glass at the same glass receiving station and to move the transfer member of each unit from said glass receiving position laterally in the same general direction from said receiving station to a plurality of glass delivering positions successively in a cylic order.

2. Glass delivery apparatus comprising a plurality of glass transfer units, each including a movably mounted receptacle, driving mechanism adapted to be coordinated with the driving mechanism of a glass feeder for operating said units to bring the receptacles of the respective units successively in a cyclic order to position to receive glass at the same glass feeding station of the feeder and to move the receptacle of each unit with glass therein from said glass receiving position laterally in the same general direction from said feeding station to a plurality of mold charging stations successively in a cyclic order and means to cause the delivery of glass from each receptacle into a mold at each mold charging station.

3. Glass delivery apparatus comprising a plurality of glass transfer units, each including a movably mounted receptacle, driving mechanism adapted to be coordinated with the driving mechanism of a glass feeder for operating said units to bring the receptacles of the respective units successively in a cyclic order to position to receive charges of glass at the same glass feeding station of the feeder and to move the receptacle of each unit with the glass therein from the glass receiving position laterally in the same general direction from said feeding station to a plurality of mold charging stations successively in a cyclic order, and means to cause the delivery of the glass from each receptacle into a mold at each mold charging station, said driving mechanism including means whereby the operation of one or more of said units may be independently discontinued.

4. Glass delivery apparatus comprising a plurality of glass transfer units, each including a movably mounted receptacle, driving mechanism adapted to be coordinated with the driving mechanism of a glass feeder for operating said units to bring the receptacles of the respective units successively in a cyclic order to a position to receive successive charges of glass from the feeder and to move the receptacle of each unit with the glass therein from said glass receiving position to a plurality of mold charging stations successively in a cyclic order, means to cause the delivery of the glass from each receptacle into a mold at each mold charging station, and means whereby the transfer movements of said receptacles may be arrested at cullet receiving stations to permit the discharge of glass from the receptacles at such stations without altering the operations of said driving mechanism or of the associated feeder.

5. Glass delivery apparatus comprising a transfer receptacle, a rocker arm supporting said receptacle for swinging movement from a position to receive glass charges from a feeder to positions at a plurality of mold charging stations successively in a cyclic order, means for operating said rocker arm to cause successive cycles of operating movements of the receptacle, said operating means including a cam for controlling the movements of the receptacle during each of its cycles and a drive shaft receiving motion from an operating part of the feeder and connected to rotate said cam, coperative stop means operable at will to arrest the glass transfer movements of said receptacle at a cullet receiving station, and means operable by said operating means to cause discharge of the glass from the receptacle when the receptacle is at any of the mold charging stations to which it is moved successively when said stop means is inactive and to cause discharge of the glass from the receptacle when said receptacle is at the cullet receiving station to which the receptacle is moved when said stop means is in operation.

6. Glass delivery apparatus comprising a plurality of individual glass transfer units, each including a receptacle adapted to receive charges of glass at the same glass feeding station of a feeder and to transfer successive charges laterally in the same general direction from the feeding station to molds at different mold charging stations successively in a cyclic order, and operating means coordinated with the operating mechanism of the feeder and timed to bring the transfer receptacles of the respective units to said glass receiving position successively in a cyclic order and to cause said glass transfer movements of each of the receptacles to its respective associate mold charging stations in succession, said operating means including a final drive shaft comprising an individual section for each of said transfer units, clutch mechanism between the adjacent ends of the respective sections of the final drive shaft, intermediate driving means between one of said sections of the final drive shaft and a rotating part of the feeder and a clutch associated with said intermediate driving means operable to discontinue the driving connection between all said sections and the rotating part of the feeder during the continued operation of the latter.

7. In glass delivery apparatus, a pair of glass transfer units, each including a horizontally swingable rocker arm, a transfer cup carried by said rocker arm and movable with the latter from position to receive glass charges at the same glass feeding station of a feeder laterally in the same general direction to glass discharging positions above molds at two mold charging stations alternately, a cam for controlling the swinging movements of the rocker arm of each unit, the respective cams of the two units being relatively arranged to cause the respective transfer cups to be brought alternately to said glass receiving position and so that the transfer cup of one unit is in its glass discharging position above a mold when the transfer cup of the other unit is at said glass receiving position, and unitary driving mechanism adapted to be coordinated with the driving mechanism of the feeder for operating the cams of the respective units.

8. Glass delivery apparatus comprising a plurality of movable glass transfer receptacles and operating means for imparting to each of said receptacles successive cycles of operation, each comprising a plurality of glass transferring movements from a position to receive a charge of glass at the same glass feeding station of a feeder to a glass discharging position and a movement back to said glass receiving position after each glass transferring movement, each receptacle having a plurality of glass transferring movements laterally in the same general direction from said feeding station to different discharging positions and said receptacle being maintained temporarily at said glass receiving position and at each of said glass discharging positions to permit the charging of the receptacle and the discharge of glass therefrom, respectively, said operating means being coordinated with the operations of said feeder and so constructed as to bring the respective transfer receptacles to said glass receiving position successively at the proper times to receive successive charges of glass delivered by the feeder.

9. In a glass delivery apparatus, a horizontally swingable rocker arm, a transfer cup carried by said rocker arm for movement with the latter between a position to receive glass from a glass feeder and a glass discharging position, resilient means connected to actuate said rocker arm to swing said transfer cup from its glass receiving position to said glass discharging position, a cam for cooperating with said rocker arm actuating means to return said cup to its glass receiving position after each movement to its glass discharging position, means including a second cam timed to cause discharge of glass from said cup when it is at said glass discharging position, and driving means for said cams adapted to be coordinated with the driving mechanism of said feeder.

10. Glass delivery apparatus comprising a horizontally swingable rocker arm, a transfer cup carried by said rocker arm for movement with the latter from a position to receive glass from a feeder laterally in the same general direction to a plurality of glass discharging positions at different mold charging stations successively, means for rocking said rocker arm to cause said movements of such transfer cup between said glass receiving position and said mold charging stations, said rocker arm operating means including a cam for causing the movements of the cup from each of said mold charging stations to said glass receiving positions and resilient means tending to cause movement of the cup from said glass receiving position to each of said mold charging stations.

11. Glass delivery apparatus comprising a horizontally swingable rocker arm, a transfer cup carried by said rocker arm for movement with the latter between a position to receive glass from a feeder to a plurality of glass discharging positions at different mold charging stations successively, means for rocking said rocker arm to cause said movements of such transfer cup between said glass receiving position and said mold charging stations, said rocker arm operating means including a cam for causing the return movements of the cup to said glass receiving position and resilient means tending to cause the glass transferring movements of the cup from said glass receiving position to each of said mold charging stations, a stop member carried by said rocker arm, and a cooperative stop member for engaging with said first stop member when said transfer cup has moved a certain distance from said glass receiving position toward the adjacent mold charging station to arrest the glass transferring movements of the cup at a position suitable to permit discharge of the glass from the cup into a cullet receptacle, one of said stop members being removable and replaceable at will.

12. The combination with glass feeding mechanism operable to supply a series of charges of molten glass, of a plurality of movable transfer receptacles, each movable between a position to receive charges at the same feeding station of said feeder and a plurality of mold charging stations located at the same side of said feeding station, successively, cam controlled means for moving each receptacle back and forth between each of its associate mold charging stations and said glass receiving position, the respective cam controlled means for the several receptacles being timed to bring the respective receptacles to said glass receiving position successively, and means receiving motion from an operating part of said feeder for actuating said cam controlled means to properly time the respective movements of the transfer receptacles to said glass receiving position with respect to the times of delivery of successive charges by the feeder.

13. The combination with a glass supply means of a transfer cup, means for moving said cup from a position to receive glass from said supply means at a glass receiving station to a plurality of glass delivery stations successively, said stations being located at different distances from said receiving station, and means separate from the cup moving means and having cycles of movement timed with relation to the movements of said cup to cause delivery of glass from said cup at each of said glass delivery stations.

14. The combination with a glass feeder of a transfer cup, means for moving said cup between a position to receive glass from said feeder and a position to deliver the glass to a mold at a charging station laterally of said glass receiving position, a cullet receptacle between said glass receiving position and said mold charging station, means effective at will to halt at said cullet receptacle the movement of said cup away from the glass receiving position toward the mold charging station, and means for causing delivery of glass from the cup either into said cullet receptacle or into the mold at the delivery station according to whether the cup is halted at the cullet receptacle or is moved to the mold charging station, said last named means being operable to cause the same duration of contact with the cup of the glass delivered at the cullet receptacle as the glass delivered at the mold charging station.

Signed at Hartford, Connecticut, this 2nd day of January, 1929.

WILLIAM T. BARKER, Jr.